US011816707B2

(12) United States Patent
Mossoba et al.

(10) Patent No.: US 11,816,707 B2
(45) Date of Patent: *Nov. 14, 2023

(54) AUGMENTED REALITY SYSTEMS FOR FACILITATING REAL-TIME CHARITY DONATIONS

(71) Applicant: Capital One Services, LLC, McLean, VA (US)

(72) Inventors: Michael Mossoba, Arlington, VA (US); Salik Shah, Washington, DC (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,231

(22) Filed: Mar. 25, 2020

(65) Prior Publication Data
US 2020/0279305 A1 Sep. 3, 2020

Related U.S. Application Data

(63) Continuation of application No. 16/288,830, filed on Feb. 28, 2019, now Pat. No. 10,636,062.

(51) Int. Cl.
G06F 3/01 (2006.01)
G06V 20/20 (2022.01)
(Continued)

(52) U.S. Cl.
CPC ......... G06Q 30/0279 (2013.01); G06F 3/017 (2013.01); G06V 20/20 (2022.01); G06F 3/04842 (2013.01); G06F 3/04883 (2013.01)

(58) Field of Classification Search
CPC .... G06Q 30/0279; G06Q 30/02; G06F 3/017; G06F 3/04842; G06F 3/0488; G06F 3/04883; G06F 3/011
(Continued)

(56) References Cited

U.S. PATENT DOCUMENTS 7,620,636 B2 11/2009 Fasciano
8,020,754 B2 9/2011 Schwarz, Jr.
(Continued)

OTHER PUBLICATIONS

App of the Week. (Nov. 8, 2014). South Wales Echo Retrieved from http://dialog.proquest.com/professional/docview/1621629305?accountid-131444 (Year: 2014).
(Continued)

Primary Examiner — Reza Nabi
Assistant Examiner — Hwei-Min Lu
(74) Attorney, Agent, or Firm — TROUTMAN PEPPER HAMILTON SANDERS LLP; Christopher J. Forstner; John A. Morrissett

(57) ABSTRACT

Disclosed systems and methods provide an augmented environment that facilitates a donation to a charity. A system may receive organization data including data associated with a plurality of charitable organizations. The system may also receive (i) environmental data including an image of an object, and (ii) location data indicating the image location. Further, the system may identify the object and determine one or more qualifying charities associated with the object. The system may augment the environmental data by adding enhanced content such as an identification of the qualifying charity, transmit the enhanced content to a mobile device for display, and initiate a transfer of funds from a user account to a charity financial account associated with the qualifying charity.

20 Claims, 6 Drawing Sheets

(51) Int. Cl.
*G06F 3/04883* (2022.01)
*G06F 3/04842* (2022.01)
*G06Q 30/0279* (2023.01)

(58) Field of Classification Search
USPC .......................................................... 705/329
See application file for complete search history.

(56) References Cited

U.S. PATENT DOCUMENTS

| | | | |
|---|---|---|---|
| 8,543,509 B1 | 9/2013 | Gundy | |
| 2001/0001855 A1* | 5/2001 | Ziarno | G06Q 30/02 |
| | | | 705/64 |
| 2010/0325563 A1* | 12/2010 | Goldthwaite | G06T 17/05 |
| | | | 715/757 |
| 2011/0175822 A1* | 7/2011 | Poon | H04W 4/023 |
| | | | 345/173 |
| 2012/0218423 A1* | 8/2012 | Smith | G06T 19/20 |
| | | | 348/207.1 |
| 2013/0085897 A1* | 4/2013 | Favoretto | G06F 16/284 |
| | | | 707/825 |
| 2013/0110738 A1* | 5/2013 | McHorris | G06Q 10/06 |
| | | | 705/329 |
| 2013/0227384 A1 | 8/2013 | Good et al. | |
| 2014/0188711 A1* | 7/2014 | Poster | G06Q 30/0617 |
| | | | 705/39 |
| 2014/0278861 A1 | 9/2014 | Bush et al. | |
| 2014/0304187 A1* | 10/2014 | Menn | G06Q 30/0279 |
| | | | 705/329 |
| 2014/0317012 A1* | 10/2014 | Can | G06Q 30/0279 |
| | | | 705/329 |
| 2015/0006426 A1 | 1/2015 | Sobhani et al. | |
| 2015/0154667 A1 | 6/2015 | Hicks et al. | |
| 2015/0186984 A1* | 7/2015 | Loganathan | G07F 9/0235 |
| | | | 705/27.1 |
| 2015/0339639 A1* | 11/2015 | Choe | G06Q 20/10 |
| | | | 705/39 |
| 2015/0358390 A1 | 12/2015 | Starr et al. | |
| 2016/0203535 A1* | 7/2016 | Nguyen | G06Q 30/0617 |
| | | | 705/26.4 |
| 2016/0321935 A1* | 11/2016 | Mohler | G09B 5/08 |
| 2016/0343043 A1* | 11/2016 | Hicks | G06Q 50/01 |
| 2017/0024780 A1* | 1/2017 | Sobhani | G06Q 30/0207 |
| 2017/0132673 A1 | 5/2017 | Skoog et al. | |
| 2018/0005201 A1* | 1/2018 | Jacobson | G06Q 30/02 |
| 2018/0158114 A1* | 6/2018 | Twist | G06Q 30/0279 |
| 2018/0276764 A1* | 9/2018 | Acosta | G06Q 40/123 |
| 2019/0108686 A1* | 4/2019 | Spivack | G06Q 30/0277 |
| 2019/0311386 A1 | 10/2019 | Barnes | |
| 2020/0184537 A1* | 6/2020 | Kumar | G06N 7/01 |
| 2020/0320592 A1* | 10/2020 | Soule | G06F 3/013 |

OTHER PUBLICATIONS

Gigaom: Snapdonate app uses logo recognition to make charitable giving easier over mobile (2014). Chatham: Newstex. Retrieved from http://dialog.proquest.com/professional/docview/1642451791?accountid=131444 (Year: 2014).

* cited by examiner

AUGMENTED REALITY SYSTEMS FOR FACILITATING REAL-TIME CHARITY DONATIONS

CROSS REFERENCE TO RELATED APPLICATIONS

This application is a continuation of, and claims priority under 35 U.S.C. § 120 to, U.S. patent application Ser. No. 16/288,830, filed Feb. 28, 2019, the entire contents of which are fully incorporated herein by reference.

FIELD OF INVENTION

The present disclosure relates to systems and methods for conveniently facilitating a donation to a charity in real-time based on an identified object and, more specifically, to augmented and virtual reality systems for recognizing an object, identifying a charity or charities associated with the object, and facilitating a real-time donation to an identified charity.

BACKGROUND

Seeing an item or service can often trigger an interest, or a reminder of a pre-existing interest, to donate to a charity, cause, or non-profit organization that a person associates with the item or service. For example, a person may be walking down the street, see an item of interest (e.g., an art mural), and recall his or her desire to donate to a charity associated with the item (e.g., a local art mural restoration group or local art museum). The person wants to follow up on that desire to donate to the identified charity, but all too often it is inconvenient to do so when the he or she sees the object and is triggered to do so. That is, unless the person happens to be near the charity and have time to stop by, he or she is tediously tasked with having to remember to make a donation later or forego making a donation. And, despite having the best intentions, the person may forget to make a donation later when the moment has passed or have trouble accurately recalling the associated charity.

Accordingly, there is a need for systems and methods for conveniently facilitating a real-time transaction or donation associated with previously unidentified item(s) using augmented reality and/or virtual reality. Such systems can be non-invasive to an individual's day and can provide the ability to identify objects of interest and determine associated charities to complete donations nearly instantaneously. Embodiments of the present disclosure are directed to this and other considerations.

SUMMARY

Disclosed embodiments provide systems and methods for facilitating a donation to a charity using augmented reality.

Consistent with the disclosed embodiments, a system may include one or more memory devices storing instructions and one or more processors configured to execute the instructions to perform steps of a method to facilitate a charity donation using augmented reality on a user device (e.g., a mobile device). The system may receive or store organization data associated with one or more charities, including charity names, charity locations, items associated with the charity, and a charity financial account for each of the one or more charities. The system may also receive environmental data including audio and visual information representing a physical environment (e.g. an image or video with sound of the physical environment around the user device). The system may augment the environmental data by adding virtual environmental data, and then provide the virtual environmental data to the user device for display to provide an augmented reality experience for the user. The system may then receive a selection of the one or more charities (e.g., from the user device), and transmit a request to initialize a transfer of funds from a user account associated with the user to a charity financial account associated with the selected charity.

Consistent with the disclosed embodiments, methods for facilitating a charity donation using augmented reality are also disclosed.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
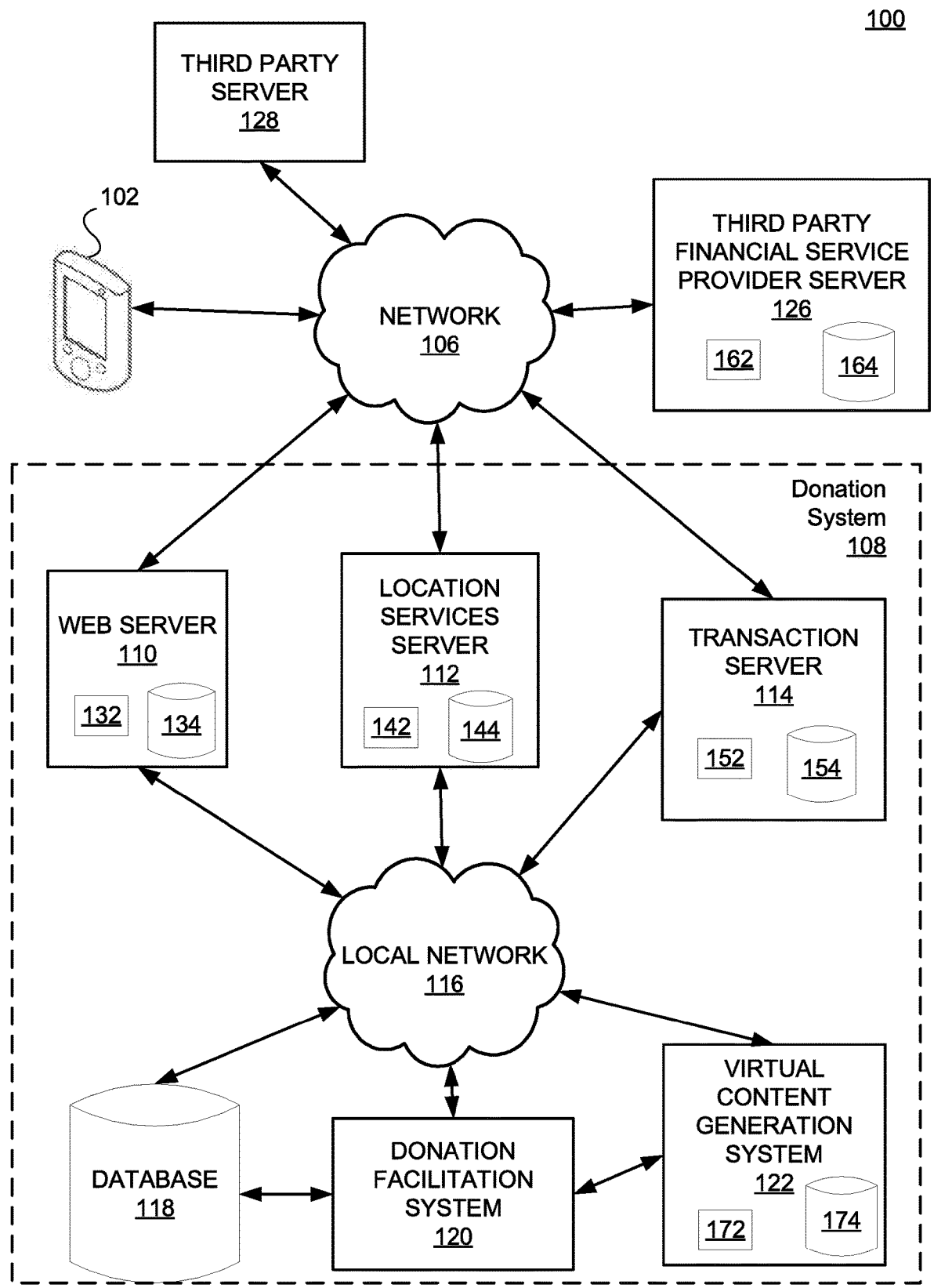
FIG. 1 is a diagram of an exemplary system that may be used to facilitate a charity transaction.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed devices, systems, and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for facilitating a charity donation using a mobile device. A disclosed method may include receiving organizational data associated with one of a plurality of charitable organizations. The organizational data may include for each charity of the plurality of charities data associated with a charity name, associated subject matter including data representing one or more items that are associated with the charity, a charity financial account, and a charity location representing a location of an office of the charity. Next, the method may include receiving, from a mobile device, and an image including at least a portion of an object, and location data indicative of an image location at which the image was obtained. The method may include identifying an object based on applying image recognition techniques to the image. Once the object has been identified, the method may include determining one or more qualifying charities based on the identification of the object and the organizational data. Each qualifying charity of the one or more qualifying charities may have associated subject matter corresponding to the identification of the object. The method may further include selecting, from among the one or more qualifying charities and based on the location data and respective charity location of each of the one or more qualifying charities, a first qualifying charity (e.g., a closest qualifying charity) by determining which charity location of each of the one or more qualifying charities has a closest proximity to the image location. Once the first qualifying charity has been selected, the method may include transmitting, an indication of the first qualifying charity to the mobile device. The method may include receiving, from the mobile device, an indication of a donation to the first qualifying charity and a donation amount. Once the indication has been received, the method may include initiating a transfer of funds from a user financial account associated with the user to a charity financial account associated with the first qualifying charity.

In some embodiments determining the identification of the object may include identifying at least one from among symbols, words, letters, and characters associated with the object and determining that the at least one identified symbol, word, letter, and/or character is associated with a known object.

In some embodiments, the method may further include receiving, from the mobile device, an indication of an electronic identifier associated with the object. Determining the identification of the object may include identifying the object based on the electronic identifier.

In some embodiments, the electronic identifier may include an RFID tag or beacon that is detected by the mobile device.

In some embodiments, determining one or more qualifying charities may include, for each charity of the one or more charities, comparing the identified object to the one or more items that are associated with the charity and identifying one or more charities in which the identified object matches an item of the respective one or more items.

In some embodiments, determining one or more qualifying charities may include, for each charity of the one or more charities, comparing the identified object to the one or more items that are associated with the charity, and determining, based on machine learning techniques, that the identified object corresponds to an item of the respective one or more items.

In some embodiments the method may further include, storing on a remotely viewable electronic map, a pin at the image location, wherein the pin represents one or more of the donation amount, the closest qualifying charity, and an identification of a donor.

In some embodiments the method may further include receiving user credentials associated with the social media account in accessing the social media account with the user credentials. In response to initiating a transfer of funds, the method may include posting content to the social media account. The content may include a representation of the donation to the closest qualifying charity.

In another aspect, a method for facilitating a localized charity donation using a mobile device is disclosed. The method may include receiving organizational data associated with a plurality of charitable organizations. The organizational data may include, for each of the one or more charities, a charity name, associated subject matter including data representing one or more items that are associated with the charity, a charity financial account, and a charity location representing a location of an office of the charity. The method may include receiving, from a mobile device, environmental data including an image of an object. The environmental data may represent a physical environment of the mobile device. The method may also include receiving, from the mobile device, location data indicative of an image location at which the environmental data was obtained. The method may include identifying an object based on applying image recognition techniques to the image and determining one or more qualifying charities based on the identified object. Each of the qualifying charities of the one or more qualifying charities may have associated subject matter the corresponds to the identification of the object. The method may include identifying, from among the one or more qualifying charities and based on the location data and respective charity location of each of the qualifying charities, a first qualifying charity by determining which respective charity location of each of the one or more qualifying charities has a closest proximity to the image location. The method may include augmenting the environmental data by adding virtual environmental data. The virtual environmental data may include enhanced content associated with the identified object and the enhanced content may be unrepresented in the physical environment while also representing the identification of the first qualifying charity. The method may include transmitting, to the mobile device, the virtual environmental data for creation of an augmented environment in combination with a display of a portion of the physical environment. The method may include receiving, from the mobile device, an indication of the donation to a selected charity (e.g., the first qualifying charity) and a donation amount. Once the indication has been received, the method may include initiating a transfer of funds from a user financial account associated with the user to the charity financial account.

In some embodiments, the selected charity is a closest qualifying charity.

In some embodiments, determining an identification of the object includes identifying, in the environmental data using image recognition techniques, a user gesture that indicates a selection of the object.

In some embodiments the method may further include, prioritizing, based on the location data and respective charity location of each of the one or more qualifying charities, the qualifying charities based on their proximity to the image location, and selecting a predetermined number of highest priority qualifying charities, the enhanced content representing each of the selected highest priority qualifying charities.

In some embodiments the method may further include, prioritizing the qualifying charities based on a proximity of each of the qualifying charities to the image location and a degree of correspondence between the identification of the object and the associated subject matter of each respective qualifying charity. Based on the prioritization, the method may include selecting a predetermined number of the highest priority qualifying charities, the enhanced content representing each of the selected highest priority qualifying charities.

In some embodiments, prioritizing the qualifying charities may include receiving, an indication of a preference as between the proximity and the degree of correspondence, and for each of the qualifying charities, determining a priority score. The priority score may be determined by assigning a first value to the proximity based on a distance between the image location and the charity location, assigning a second value to the correspondence based on the degree of correspondence, modifying the first and second values based on the indication of the preference between proximity and correspondence, and summing the modified first and second values. The method may include ordering the qualifying charities in the order of their respective priority scores.

In some embodiments, determining one or more qualifying charities may include, for each charity of the plurality of charities, comparing the identified object to the one or more items that are associated with the charity and identifying one or more charities of the plurality of charities which the identified object matches an item of the respective one or more items.

In some embodiments, determining one or more qualifying charities may include, for each charity of the plurality of charities, comparing the identified object to the one or more items that are associated with the charity and determining, based on machine learning techniques, that the identified object response to an item of the respective one or more items.

In another aspect, a method for facilitating a localized charity donation using a mobile device is disclosed. The method may include obtaining, by one or more sensors of a mobile device, environmental data representative of the physical environment of the mobile device. The environmental data may include one or more images of an object and location data representative of the location of the mobile device. The method may include transmitting, to a server, the environmental data and location data, and receiving, from the server, an augmented environment signal which may include enhanced content associated with the object. The enhanced content may not be present in the physical reality. The method may include displaying the enhanced content in association with the object on a display of the mobile device, the enhanced content being representative of the charitable organization identified as being associated with the object and being within a predetermined proximity of the location of the mobile device. The method may include receiving, by the mobile device, a user input indicative of a command to make a donation to the charitable organization. In response to the user input, the method may include generating, by the mobile device, a donation request, the donation request being representative of an instruction to transfer a donation amount from a financial account associated with a user of the mobile device to a financial account associated with the charitable organization. Finally, the method may include transmitting, to the server, the donation request for execution.

In some embodiments, receiving a user input may include detecting a gesture performed by a user of the mobile device and determining that the gesture indicates a selection of the enhanced content displayed by the mobile device in association with the object.

In some embodiments, displaying the enhanced content in association with the object may include superimposing the enhanced content over a portion of the object in an augmented reality display.

In some embodiments, the enhanced content may represent a virtual button that initiates a donation transaction to the charitable organization when selected.

Optionally, in some embodiments, the system may facilitate another action in lieu of or in addition to making a donation to a charity (e.g., donating towards homeless services). For example, the system may be configured to alert a homeless outreach organization that a homeless person needs assistance based on, e.g., capturing an image of a homeless person and performing image recognition to identify the subject as a homeless person in need of services. In some embodiments, capturing an image of graffiti may indicate that the user wants to make a donation towards a city cleanup fund and may notify the city that the graffiti is present and needs to be cleaned up. In another embodiment, a captured image that is particularly inspiring to the user may be shared on social media. In some embodiments, the system may indicate to the user items that the user might want to research later (e.g., based on a captured image of a cherry tree, the system may remind the user to read about cherry trees in Japan, or it could recommend both a charity to donate to, and give an estimated cost to travel to Japan). In some embodiments, in which the user may have linked his/her account to other users, and the other users have tagged similar items, the system could make them aware of the shared interest (e.g., if a linked other user also expressed interest in the same mural as the user, it would allow for the users to bond over shared interests and promote conversation about the mural and/or associated charity).

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system that may be configured to execute the steps of a method to facilitate a charity donation (e.g., a localized charity donation) using a mobile device. The components and arrangements shown in FIG. 1 are not intended to limit the disclosed embodiments as the components used to implement the disclosed processes and features may vary.

In accordance with the disclosed embodiments, charity donation system 100 may include a user device 102 in communication with a donation system 108 via a network 106. In some embodiments, one or more of the user device 102 and the donation system 108 is also in communication with a third-party financial service provider server 126 (which may include one or more processors 162 and the one or more web server databases 164) and/or a third-party server 128 via the network 106. Collectively, one or more of the components of the charity donation system 100 may be configured to perform steps of methods disclosed herein.

The user device 102 may be a mobile computing device (e.g., a smart phone, tablet computer, smart wearable device, wearable augmented reality device, portable laptop computer, voice command device, or other mobile computing device) or a stationary computing device (e.g., a stationary desktop or other stationary computer). The user device 102 may belong to or be provided by a consumer, or may be borrowed, rented, or shared. In some embodiments, the user device 102 may be configured to provide one or more of an augmented reality and/or a virtual reality experience to one or more users, and may be equipped with a visual display (which may be referred to as a "display"), speakers or other auditory devices, tactile simulators, and other devices configured to engage the user's senses to enhance the augmented/virtual reality experience.

In some embodiments, the user device 102 of the charity donation system 100 may communicate with the donation system 108, which includes various components connected by a local network 116. The donation system 108 may include one or more of a web server 110, a location services server 112, a transaction server 114, a database 118, a donation facilitation system 120, and a virtual content generation system 122, which all may be connected via the local network 116.

In some embodiments, the donation facilitation system 120 of the donation system 108 may perform some of the steps of the method. In some embodiments, some or all of the steps performed by the donation facilitation system 120 may be performed by the third-party financial service provider 126 and/or by the third-party server 128.

Network 106 may be of any suitable type, including individual connections via the internet such as cellular or WiFi networks. In some embodiments, network 130 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), or a local area network (LAN) such as Ethernet. Because the information transmitted may be personal or confidential, security concerns may dictate one or more of these types of connections be encrypted or otherwise secured. In some embodiments, however, the information being transmitted may be less personal, and therefore the network connections may be selected for convenience over security. The local network 116 may share some or all of the features disclose with respect to the network 106.

Figure 2:
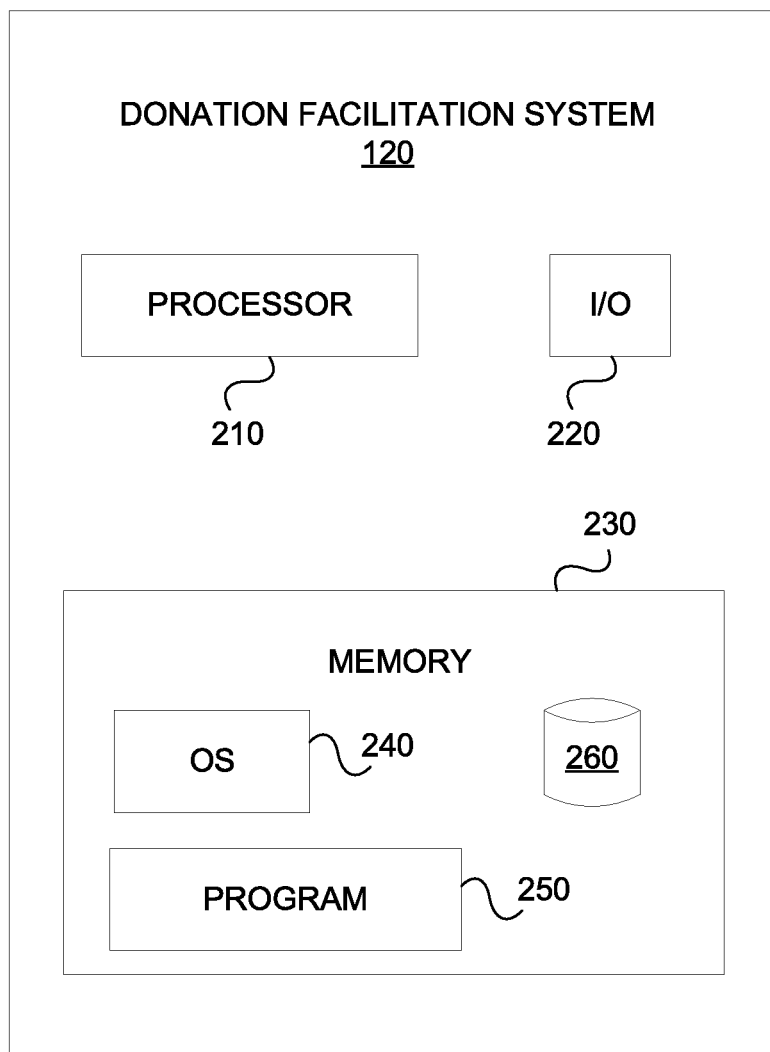
FIG. 2 is a component diagram of a donation facilitation system of FIG. 1.

An exemplary embodiment of donation facilitation system 120 is shown in more detail in FIG. 2. Web server 110, location services server 112, transaction server 114, virtual content generation system 122, third-party financial service provider server 126, and third-party server 128 may have a similar structure and components that are similar to those described with respect to donation facilitation system 120. As shown, donation facilitation system 120 may include a processor 210, an input/output ("I/O") device 220, a memory 230 containing an operating system ("OS") 240, a program 250, and a donation facilitation database 260. For example, donation facilitation system 120 may be a single server or may be configured as a distributed computer system including multiple servers or computers that interoperate to perform one or more of the processes and functionalities associated with the disclosed embodiments. In some embodiments, the donation facilitation system 120 may further include a peripheral interface, a transceiver, a mobile network interface in communication with the processor 210, a bus configured to facilitate communication between the various components of the donation facilitation system 120, and a power source configured to power one or more components of the donation facilitation system 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Donation facilitation system 120 may include one or more storage devices configured to store information used by processor 210 (or other components) to perform certain functions related to the disclosed embodiments. In one example, donation facilitation system 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage (e.g., via the database 118) or available from a memory over a network. The one or more storage devices may be a volatile or non-volatile, magnetic, semiconductor, tape, optical, removable, non-removable, or other type of storage device or tangible computer-readable medium.

In one embodiment, donation facilitation system 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, donation facilitation system 120 may include memory 230 that may include one or more programs 250 to perform one or more functions of the disclosed embodiments. Moreover, processor 210 may execute one or more programs 250 located remotely from charity donation system 100. For example, charity donation system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments.

Donation facilitation system 120 may also be communicatively connected to one or more memory devices (e.g., databases 118) locally or through a network. The remote memory devices may be configured to store information and may be accessed and/or managed by donation facilitation system 120. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Donation facilitation system 120 may also include one or more I/O devices 220 that may include one or more interfaces for receiving signals or input from devices and providing signals or output to one or more devices that allow data to be received and/or transmitted by donation facilitation system 120. For example, donation facilitation system 120 may include interface components, which may provide interfaces to one or more input devices, such as one or more keyboards, mouse devices, touch screens, track pads, trackballs, scroll wheels, digital cameras, microphones, sensors, and the like, that enable donation facilitation system 120 to receive data from one or more users (e.g., via user device 102).

In exemplary embodiments of the disclosed technology, donation facilitation system 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While donation facilitation system 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the donation facilitation system 120 may include a greater or lesser number of components than those illustrated.

Web server 110 may have one or more processors 132 and the one or more web server databases 134, which may be any suitable repository of organizational data. Information stored in the web server 110 may be accessed (e.g., retrieved, updated, and added to) via local network 116 by one or more devices (e.g., donation facilitation system 120) of donation system 108. Web server 110 may act as the point of interaction between user device 102 and donation system 108. For example, web server 110 may transmit data received from the virtual content generation system 122 to user device 102.

Location services server 112 may have one or more processors 142 and the one or more web server databases 144, which may be any suitable repository of organizational data (e.g., charity locations for each of the plurality of charities). Information stored in the location services server 112 may be accessed (e.g., retrieved, updated, and added to) via local network 116 by one or more devices (e.g., donation facilitation system 120) of donation system 108.

Transaction server 114 may have one or more processors 152 and the one or more web server databases 154, which may be any suitable repository of organizational data (e.g., charity financial accounts for each of the plurality of charities). Information stored in the transaction server 114 may be accessed (e.g., retrieved, updated, and added to) via local network 116 by one or more devices (e.g., donation facilitation system 120) of donation system 108. Transaction server 114 may act as the point of interaction between the charity financial account and a user financial account by initiating a transfer of funds from a user financial account to the charity financial account of a selected qualifying charity.

Virtual content generation system 122 may have one or more processors 172 and the one or more web server databases 174, which may be any suitable repository of organizational data (e.g., environmental data received from user device 102). Information stored on virtual content generation device 122 may be accessed (e.g., retrieved, updated, and added to) via local network 116 by one or more devices (e.g., donation facilitation system 120) of donation system 108. Virtual content generation system 122 may receive, from user device 102, environmental data including an image of an object representing a physical environment of user device 102. In response to receiving the environmental data and an indication of a selected qualifying charity, the virtual content generation system 122 may augment the environmental data by adding virtual environmental data including enhanced content associated with an object identified from an image captured by user device 102.

In some embodiments, donation facilitation system 120 may be configured to receive organizational data associated with a plurality of charitable organizations to store on database 118. Organizational data may include charity names, objects or items that may be associated with the charity, charity financial accounts, and charity locations (e.g., office locations associated with the charity). Donation facilitation system 120 may receive, from a mobile device (e.g., user device 102) an image captured by a user wishing to donate to a charity based on an object in the physical world associated with the charity. The received image may include at least a portion of an object and location data indicative of the location where the image was taken. For example, user device 102 may transmit to donation system 108, via web server 110, an image and user device 102 may transmit associated location data to the location services server 112. Both the image and associated location data may be transmitted via local network 116 to database 118 for access by donation facilitation system 120. Donation facilitation system 120 may apply image recognition techniques to the image to identify the object from the image and determine based on the identification of the object and the stored organizational data one or more qualifying charities that may be transmitted to the mobile device. Donation facilitation system 120 may query location services server 112 to identify a closest qualifying charity (e.g., a first qualifying charity) from among the one or more qualifying charities and may request web server 110 to transmit the closest qualifying charity to user device 102. Donation facilitation system 120 may receive an indication of the donation from the user device 102 including a donation amount. Donation facilitation system 120 may prompt transaction server 114 to initiate a transfer of funds from a user financial account (e.g., by communicating with a third-party service provider server 126 via network 106) to a charity financial account.

In some embodiments, donation facilitation system 120 may provide to user device 102 virtual content that may be generated by virtual content generation system 122. Virtual content may be configured to augment environmental data (e.g., the image and respective location data of the image) by providing enhanced content associated with the object identified by donation facilitation system 120. In some embodiments donation facilitation system 120 may be configured to identify the object from the captured image by identifying a user gesture that indicates a selection of the object.

In some embodiments, donation facilitation system 120 may select the closest qualifying charity as the selected charity recommendation. In some embodiments, donation system 108 may provide more than one charity recommendation to user device 102. In some embodiments, donation system 108 (e.g., via donation facilitation system 120) may prioritize, based on the location data and respective charity location of each of the one or more qualifying charities, and a degree of correspondence between the identified object subject matter and the associated respective charity and select a predetermined number of highest priority qualifying charities for display to the user via user device 102 (e.g. displaying enhanced content to user device 102). In some embodiments, prioritizing the qualifying charities may include determining a priority score for each of the charities by assigning a first value to the proximity between the image location and each respective charity, and assigning a second value to the correspondence based on the degree of correspondence between the image object and each respective charity. The device may then allow for modification based on a preference or selection of the user (e.g., via user device 102). The device may then sum the modified first and second values and order the qualifying charities in order of their respective priority scores when displaying the results to user device 102. In some embodiments, determining one or more qualifying charities may include, for each of the plurality of charities, comparing the object of the image to the one or more items associated with the charity and determining one or more charities in which the object matches an item of the one or more items associated with the charity. In some embodiments, the identified object may be determined as corresponding to an item of the one or more items based on machine learning techniques.

Figure 3:
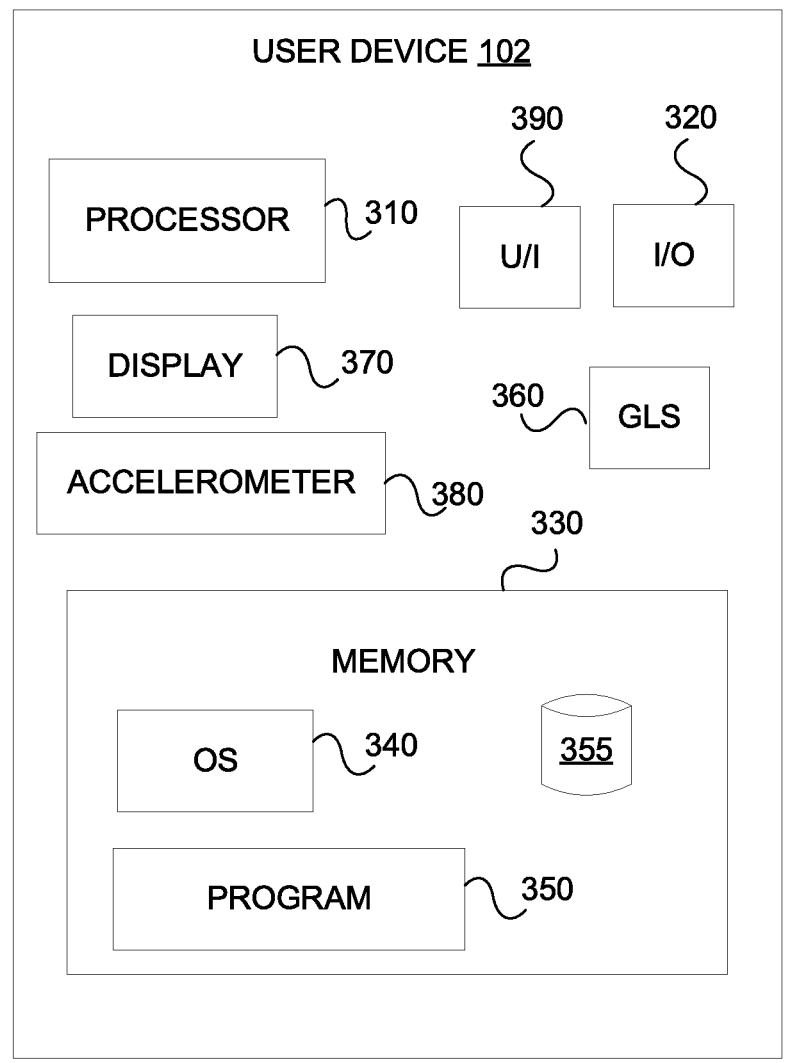
FIG. 3 is a component diagram of a user device of FIG. 1.

FIG. 3 shows an exemplary embodiment of user device 102. As shown, user device 102 may include input/output ("I/O") device 320 for transmitting, e.g., environmental data to a donation facilitation system 120, memory 330 for storing profile data comprising a user financial account and containing operating system ("OS") 340 and program 350 and all associated components as described above with respect to donation facilitation system 120. Additionally, user device 102 may also have one or more processors 310, a database 355 for storing data obtained from the one or more sensors of user device 102, a geographic location sensor ("GLS") 360 for determining the geographic location of user device 102, a display 370 for displaying augmented environmental data, an accelerometer 380 for detecting user input (e.g., shaking or rotating the user device 102), and a user interface ("U/I") device 390 for receiving user input data associated with giving an indication of a donation to a selected charity and a donation amount.

In some embodiments, display 370 of user device 102 may be configured to augment the environmental data represented by the captured image by adding virtual environmental data (e.g., generated by virtual content generation system 122). User device 102 may be configured to detect the gesture performed by a user of the mobile device and determine that the gesture indicates a selection of the enhanced content that may be displayed by the mobile device in association with an identified object within the captured image.

Figure 4:
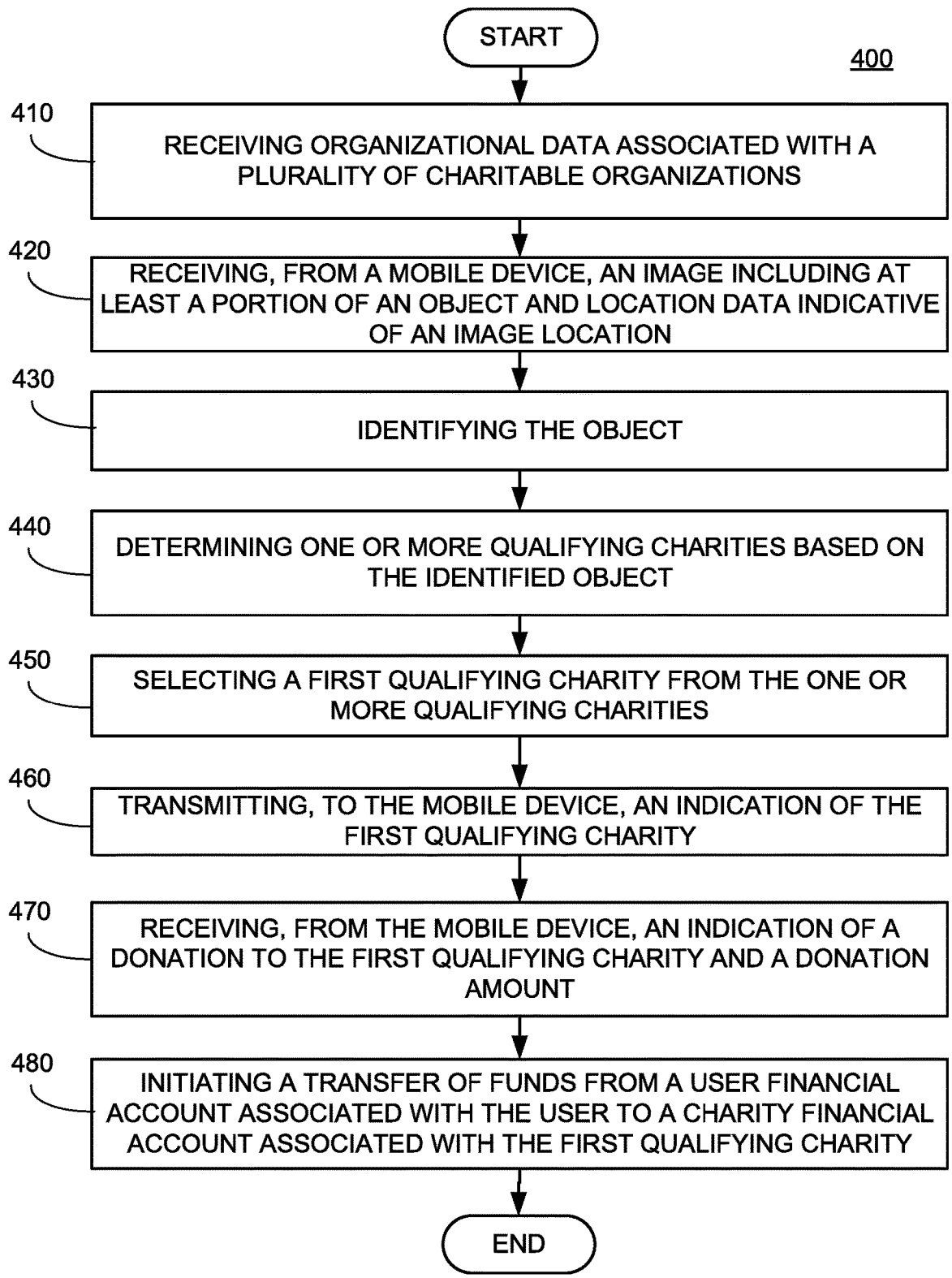
FIG. 4 is a flowchart of an exemplary method for facilitating a charity donation using image recognition from the perspective of a donation facilitation system.

FIG. 4 shows a flowchart of method 400 for facilitating a charity donation using a mobile device (e.g., user device 102), according to an exemplary embodiment. Method 400 may be performed by one or more components of a system such as charity donation system 100 (e.g., donation facilitation system 120 using processor 210 to execute memory 230). In some embodiments, one or more steps of method 400 may be delegated to other devices or systems of charity donation system 100, such as third-party server 128, third-party financial service provider 126, user device 102, web server 110, location services server 112, transaction server 114, and virtual content generation system 122. Following method 400, user(s) may receive a charity recommendation from a mobile device (e.g., user device 102) in response to a captured image.

In block 410, the system (e.g., via donation facilitation system 120 and/or database 118 within donation system 108) may receive organizational data associated with the plurality of charitable organizations. Organizational data may include charity names, data representing one or more items or objects that are associated with each respective charity (e.g., statues, landmarks, art murals, etc.), a charity financial account for each charity (e.g., which may be associated with a third-party financial service provider server 126 and which may include other financial information is needed to initiate and authorize a payment), and charity locations for each respective charity (e.g., GPS coordinates of an office building associated with the charity). In some embodiments, organizational data may be received and stored by third-party server 128.

In block 420, the system (e.g., donation facilitation system 120 via web server 110 within donation system 108) may receive from a mobile device (e.g., user device 102), an image including at least a portion of an object and location data indicative of the location at which the image was taken. For example, audio, visual, and location data may be obtained from one or more sensors associated with user device 102 (e.g., via GLS 360 for capturing location data of the image, and I/O 320 for capturing the image). According to some embodiments, donation system 108 may receive from the mobile device (e.g., user device 102), an electronic identifier associated with the object in the image which may be used to identify the object in the image. The electronic identifier may be an RFID tag associated with the object that may be detected by the mobile device.

According to some embodiments, the system may identify the object by receiving (e.g., from user device 102) user input data indicative of a selection of one or more objects present in the physical environment. User input (e.g., received by I/O 320 of user device 102) may be a gesture or audible command detected by one or more sensors of user device 102. For example, a user may select a particular object that the user is viewing in the physical world (or in a virtual environment) by providing a selection input. In some embodiments, the selection input may include visually focusing (e.g., such that the object is within the field of view or a particular area of the field of view of a camera associated with user device 102) on a particular object for more than a predetermined threshold of time. In some embodiments, a user may select a particular object by focusing a camera of, for example, user device 102 (e.g., a smart phone or wearable headset), at the object and engaging a predetermined input that may be detected by user device 102, such as selecting a button, blinking, winking, or issuing a vocal command. In some embodiments, a selection input may include performing a detectable gesture associated with an item. For example, to select an object in a user's field of view, the user may make a grabbing gesture towards the object such that the grabbing gesture may be detected by a camera associated with user device 102. According to some embodiments, a user may select an object by some combination of inputs to user device 102. For example, in some embodiments, a user may select an object by visually focusing on the object and simultaneously issuing an audible command that may be detected by user device 102. As another example, in some embodiments, a user may select an object by touching the object on the display of user device 102.

In block 430, the system (e.g., donation facilitation system 120) may apply image recognition techniques to the image received from the mobile device to identify the object in the image. In some embodiments, the donation system 108 may receive one or more 3-dimensional models of the one or more objects to aid in performing image recognition from, for example, third party server 128. For example, a charity associated with historical monuments may provide a virtual 3-dimensional model of a monument associated with the charity. Identified objects may be items that a user of the system observes as (s)he moves through the world (or through a virtual environment) that (s)he may wish to support by making a donation to an associated charity.

In block 440, the system (e.g., via donation facilitation system 120 of donation system 108) may determine one or more qualifying charities based on the identified object and the organizational data (e.g., location data and/or RFID electronic identifier). In some embodiments, the donation facilitation system 120 may query the location services server 112 to determine which charities are qualifying charities based on location data.

In block 450, the system (e.g., via donation facilitation system 120 of donation system 108) may select a first (e.g., closest) qualifying charity from the one or more qualifying charities. In some embodiments, the first qualifying charity may be the charity that is physically closest to the location of the image. In other embodiments, the first qualifying charity may be the charity that corresponds most closely with the object in the image. Furthermore, in some embodiments, the first qualifying charity may be the charity that most closely corresponds to the object in the image and is geographically close (e.g., within the same state or zip code) to the location of the image.

In block 460, the system (e.g., via web server 110 and at the direction of donation facilitation system 120 within donation system 108) may transmit to user device 102 an indication of the first qualifying charity identified above in block 450. In some embodiments, the indication may include a recommended donation amount in addition to the first qualifying charity. In some embodiments, the recommended donation amount may be based on past donations that the user may have made to the charity in question or similar charities. Past donations may be identified by parsing through the user's transaction history. In some embodiments, a user may accept or deny the first qualifying charity of the one or more qualifying charities and the system will then select a second qualifying charity from the one or more qualifying charities (e.g., in accordance with the method of block 450) that may also be either accepted or denied. A user may deny the second qualifying charity and every subsequent charity of the one or more qualifying charities until every charity of the one or more qualifying charities is exhausted, in which case no donation may be made to any of the one or more qualifying charities. In some embodiments, the user may select a second qualifying charity, a third qualifying charity, or an $n^{th}$ qualifying charity as the charity to which a donation may be made, wherein an $n^{th}$ qualifying charity may be any one of the one or more qualifying charities.

In block 470, the system may receive (e.g., via web server 110 and at the direction of donation facilitation system 120 within donation system 108), from user device 102, an indication of a donation to the first qualifying charity and a donation amount. In some embodiments, the donation indication may be identified by receiving (e.g., from user device 102) user input data indicative of a donation to the first qualifying charity. User input (e.g., received by I/O 320 of user device 102) may be a gesture or audible command detected by one or more sensors of user device 102. For example, a user may identify that he or she wishes to donate to the recommended first qualifying charity by e.g., selecting a button, blinking, winking, or issuing a vocal command. In some embodiments, a selection input may include performing a detectable gesture associated with the first qualifying charity or the identified object. For example, in some embodiments, a user may select the first qualifying charity by visually focusing on the object and simultaneously making a gesture that may be detected by user device 102. As another example, in some embodiments, a user may select the first qualifying charity by touching a display (e.g., display 370) of the user device 102.

In block 480, the system may (e.g., via transaction server 114 and at the direction of donation facilitation system 120 within donation system 108) initiate a transfer of funds from a user financial account associated with user device 102 to a charity financial account associated with the first qualifying charity (e.g., via transaction server 114 initiating a transaction with third-party financial service provider server 126) responsive to receiving the indication of a donation from user device 102. In some embodiments, the users of the system may preconfigure charity accounts that may be associated with the user financial account associated with user device 102 to enable an automatic transfer of funds from their account. In some embodiments, when the first qualifying charity is a new charity, the user may configure the new charity account before initializing a transfer of funds from the user financial account associated with user device 102.

Figure 5:
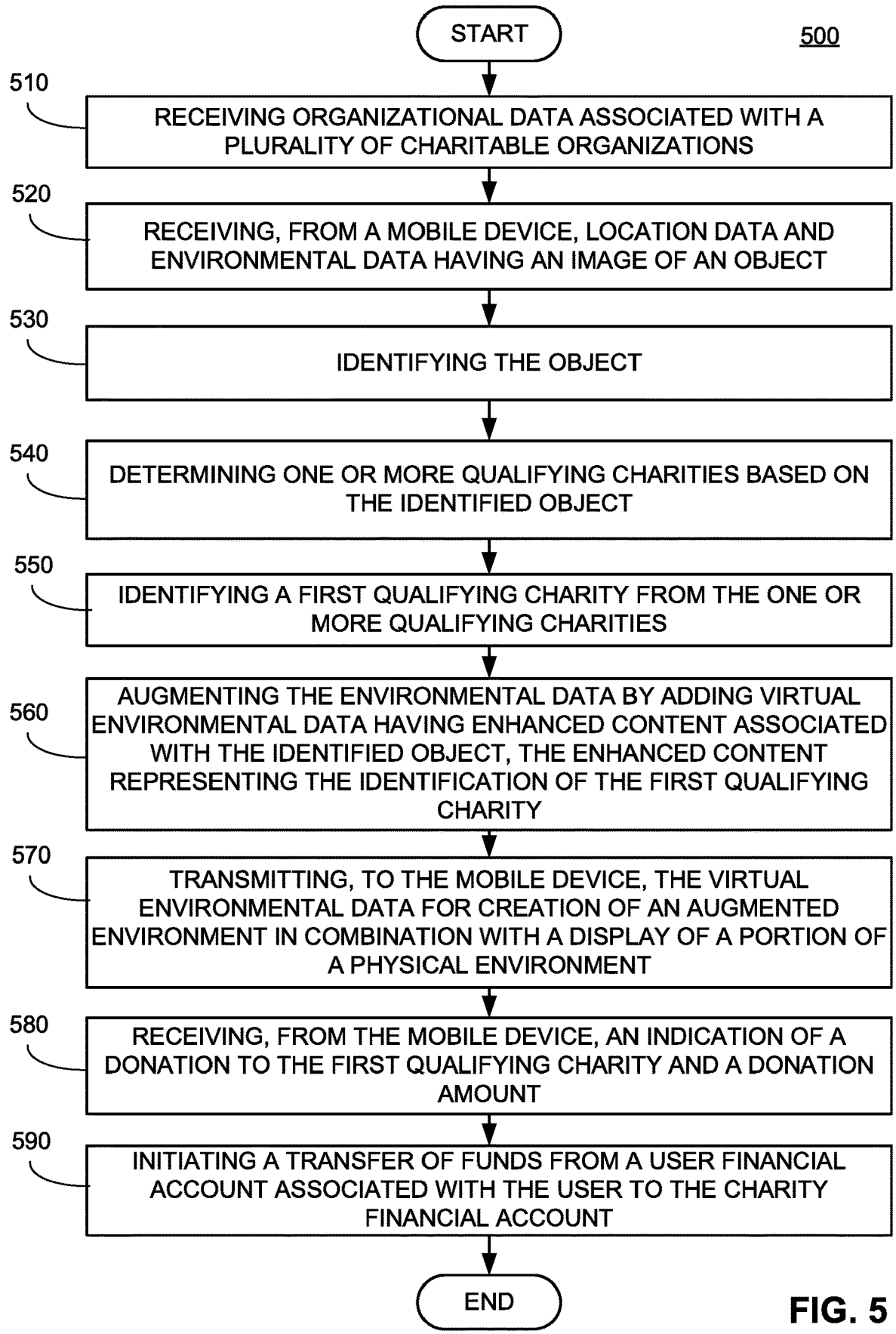
FIG. 5 is a flowchart of an exemplary method for facilitating a charity donation using image recognition and augmented reality from the perspective of a donation facilitation system.

FIG. 5 shows a flowchart of method 500 for facilitating a charity donation using a mobile device (e.g., user device 102) using augmented environmental data comprising virtual environmental data, according to an exemplary embodiment. Method 500 may be performed by donation facilitation system 120 using processor 210 to execute memory 230. In some embodiments, one or more steps of method 500 may be delegated to other devices or systems of charity donation system 100, such as third-party server 128, third-party financial service provider 126, user device 102, web server 110, location services server 112, transaction server 114, and virtual content generation system 122. Following method 500, user(s) may receive virtual data comprising a charity recommendation in response to receiving, from a mobile device (e.g., user device 102) a captured image.

In block 510, donation system 108 (e.g., via database 118) may receive organizational data associated with the plurality of charitable organizations. Organizational data may include charity names, data representing one or more items or objects that are associated with each respective charity (e.g., statues, landmarks, art murals, etc.), a charity financial account for each charity (e.g., which may be associated with a third-party financial service provider server 126 and which may include other financial information is needed to initiate and authorize a payment), and charity locations for each respective charity (e.g., GPS coordinates of an office building associated with the charity). In some embodiments, organizational data may be received and stored by third-party server 128.

In block 520, donation system 108 (e.g., via web server 110) may receive from a mobile device (e.g., user device 102), a location data and environmental data including an image of an object. The environmental data may include at least a portion of an object and location data indicative of the location of where the image was taken. For example, audio, visual, and location data may be obtained from one or more sensors associated with user device 102 (e.g., via GLS 360 for capturing location data of the image, and I/O 320 for capturing the image). According to some embodiments, donation system 108 may receive from the mobile device (e.g., user device 102), an electronic identifier associated with the object in the image which may be used to identify the object in the image. The electronic identifier may be an RFID tag associated with the object that may be detected by the mobile device.

According to some embodiments, the object may be identified by receiving (e.g., from user device 102) user input data indicative of a selection of one or more objects present in the physical environment. User input (e.g., received by I/O 320 of user device 102) may be a gesture or audible command detected by one or more sensors of user device 102. For example, a user may select a particular item that the user is viewing in the world (or, in a virtual environment) by providing a selection input. In some embodiments, a selection input may include visually focusing (e.g., such that the item is within the field of view or a particular area of the field of view of a camera associated with user device 102) on a particular item for more than a predetermined threshold of time. In some embodiments, a user may select a particular object by focusing a camera of, for example, user device 102 (such as a smart phone or wearable headset), at the object and engaging a predetermined input that may be detected by user device 102, such as selecting a button, blinking, winking, or issuing a vocal command. In some embodiments, a selection input may include performing a detectable gesture associated with an object. For example, to select an object in a user's field of view, the user may make a grabbing gesture towards the object such that the grabbing gesture may be detected by a camera associated with user device 102. According to some embodiments, a user may select an object by some combination of inputs to user device 102. For example, in some embodiments, a user may select an object by visually focusing on the object and simultaneously issuing an audible command that may be detected by user device 102. As another example, in some embodiments, a user may select an object by touching the object on a touch display 370 of the user device 102.

In block 530, donation facilitation system 120 may apply image recognition techniques to the image received from the mobile device to identify the object in the image. In some embodiments, the donation system 108 may receive one or more 3-dimensional models of the one or more objects to aid in performing image recognition from, for example, third party server 128. For example, a charity associated with historical monuments may provide a virtual 3-dimensional model of a monument associated with the charity. Identified objects may be items that a user of the system observes as they move through the world (or through a virtual environment) that they may wish to support by making a donation to an associated charity.

In block 540, donation system 108 (e.g., via donation facilitation system 120) may determine one or more qualifying charities based on the identified object and the organizational data (e.g., location data, environmental data, and/or RFID electronic identifier). In some embodiments, the donation facilitation system 120 may query the location services server 112 to determine which charities are qualifying charities based on location data.

In block 550, donation system 108 (e.g., via donation facilitation system 120) may determine a first qualifying charity from the one or more qualifying charities. In some embodiments, the first qualifying charity may be the charity that is physically closest to the location of the image. In other embodiments, the first qualifying charity may be the charity that corresponds most closely with the object in the image. Furthermore, in some embodiments, the first qualifying charity may be the charity that most closely corresponds to the object in the image and is geographically close (e.g., within the same state or zip code) to the location of the image.

In block 560, donation system 108 (e.g., via virtual content generation system 122) may augment the environmental data by adding virtual environmental data including enhanced content associated with the identified object. The enhanced content may be unrepresented in the physical environment and the enhanced content may represent the identification of the first qualifying charity. In some embodiments, the enhanced content may also represent a recommendation of a donation amount to give to the first qualifying charity.

In block 570, donation system 108 (e.g., via web server 110) may transmit to the mobile device, the virtual environmental data for creation of an augmented environment in combination with a display of a portion of the physical environment.

In block 580, the system may receive (e.g., via web server 110 and at the direction of donation facilitation system 120 within donation system 108), from user device 102, an indication of a donation to the closest qualifying charity and a donation amount. In some embodiments, the donation indication may be identified by receiving (e.g., from user device 102) user input data indicative of a donation to the first qualifying charity. User input (e.g., received by I/O 320 of user device 102) may be a gesture or audible command detected by one or more sensors of user device 102. For example, a user may identify that he or she wishes to donate to the recommended closest qualifying charity by e.g., selecting a button, blinking, winking, or issuing a vocal command. In some embodiments, a selection input may include performing a detectable gesture associated with the first qualifying charity or the identified object. For example, in some embodiments, a user may select the first qualifying charity by visually focusing on the object and simultaneously making a gesture that may be detected by user device 102. In another example, the user may simply touch a recommended dollar amount displayed as the enhanced content on touch display 370 of user device 102.

In block 590, the system may (e.g., via transaction server 114 and at the direction of donation facilitation system 120 within donation system 108) initiate a transfer of funds from a user financial account associated with user device 102 to a charity financial account associated with the first qualifying charity (e.g., via transaction server 114 initiating a transaction with third-party financial service provider server 126) responsive to receiving the indication of a donation from user device 102. In some embodiments, the users of the system may preconfigure charity accounts that may be associated with the user financial account associated with user device 102 to enable an automatic transfer of funds from their account. In some embodiments, when the first qualifying charity is a new charity, the user may configure the new charity account before initializing a transfer of funds from the user financial account associated with user device 102.

Figure 6:
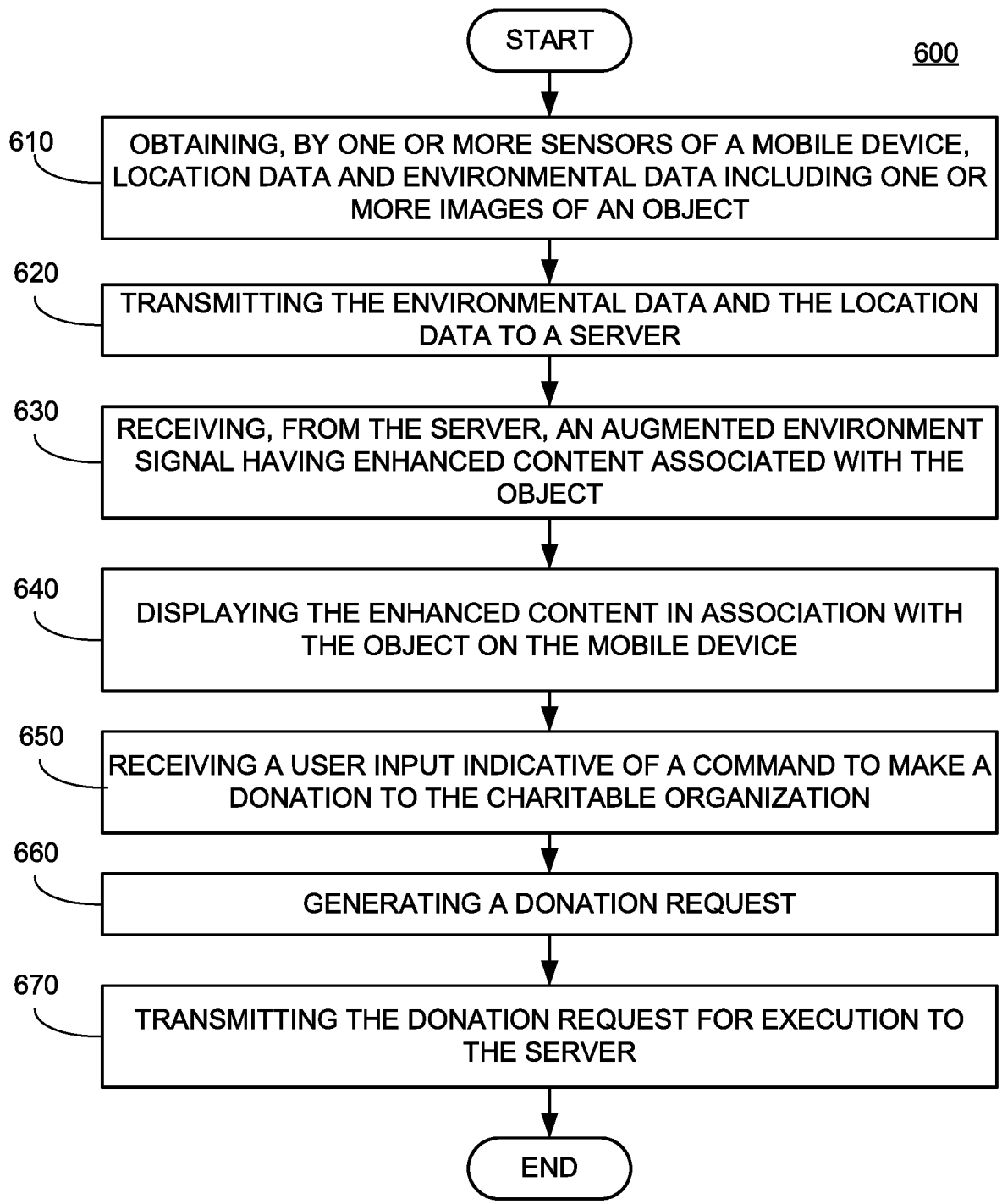
FIG. 6 is a flowchart of an exemplary method for facilitating a charity donation using image recognition and augmented reality from the perspective of a user device.

FIG. 6 shows a flowchart of method 600 for facilitating a charity donation using a mobile device, according to an exemplary embodiment. Method 600 may be performed by donation facilitation system 120 using processor 210 to execute memory 230. In some embodiments, one or more steps of method 600 may be delegated to other devices or systems of charity donation system 100, such as third-party server 128, third-party financial service provider 126, user device 102, web server 110, location services server 112, transaction server 114, and virtual content generation system 122. Following method 600, user(s) may receive a charity recommendation in response to receiving, from a mobile device (e.g., user device 102), a captured image.

In block 610, donation system 108 and/or third party server 128 (e.g., via database 118) may obtain or receive location data and environmental data including one or more images of an object that may be associated with one or more of the plurality of charitable organizations and that may be obtained by one or more sensors (e.g., I/O 320) of user device 102. For example, the environmental data may include image of a statue of a local civil war veteran. Location data may be the location of the statue of the local civil war veteran.

In block 620, user device 102 may transmit the environmental data and the location data from the user device 102 to a server (e.g., virtual content generation system 122). For example, audio, visual, and location data may be obtained from one or more sensors associated with user device 102 (e.g., via GLS 360 for capturing location data of the image, and I/O 320 for capturing the image). According to some embodiments, third party server 128 may receive from the mobile device (e.g., user device 102), an electronic identifier associated with the object in the image which may be used to identify the object in the image. The electronic identifier may be an RFID tag associated with the object that may be detected by user device 102.

According to some embodiments, the object may be identified by the server receiving (e.g., from user device 102) user input data indicative of a selection of one or more objects present in the physical environment as part of the environmental data. User input (e.g., received by I/O 320 of user device 102) may be a gesture or audible command detected by one or more sensors of user device 102. For example, a user may select a particular object that the user is viewing in the world (or, in a virtual environment) by providing a selection input. In some embodiments, a selection input may include visually focusing (e.g., such that the object is within the field of view or a particular area of the field of view of a camera associated with user device 102) on a particular object for more than a predetermined threshold of time. In some embodiments, a user may select a particular object by focusing a camera of user device 102 (e.g., a smart phone or wearable headset), at the object and engaging a predetermined input that may be detected by user device 102, such as selecting a button, blinking, winking, or issuing a vocal command. In some embodiments, a selection input may include performing a detectable gesture associated with an object. For example, to select an object in a user's field of view, the user may make a grabbing gesture towards the item such that the grabbing gesture may be detected by a camera associated with user device 102. According to some embodiments, a user may select an object by some combination of inputs to user device 102. For example, in some embodiments, a user may select an object by visually focusing on the item and simultaneously issuing an audible command that may be detected by user device 102. According to some embodiments, a user may select an object by simply touching the object on display 370 of the user device 102.

In block 630, user device 102 may receive, from the server (e.g. virtual content generation system 122), an augmented environment signal including enhanced content associated with the object. The enhanced content is not present in the physical reality. The server (e.g. virtual content generation system 122) may apply image recognition techniques to the image received from the mobile device (e.g., user device 102) to identify the object in the photo. Once the server identifies the object, it may provide an augmented environment to the user (e.g., via user device 102) that may provide information (e.g., visual and/or audible information) about the identified object, such as a selected first qualifying charity and a recommended donation amount. Identified objects may be objects that a user of the system observes as (s)he moves through the world (or through a virtual environment) that (s)he may wish to support by making a donation to an associated charity.

In block 640, mobile device (e.g., user device 102) may display (e.g., via display 370) enhanced content in association with the object. The enhanced content may be representative of a charitable organization that has been identified as being associated with the object and being within a predetermined proximity of the location of the mobile device. In some embodiments, the enhanced content may include a recommended donation amount (e.g., a recommended amount of $20, $40, $80, or $100).

In block 650, mobile device (e.g., user device 102) may receive user input indicative of a command to make a donation to the charitable organization. In some embodiments, the donation indication may be identified by receiving (e.g., from user device 102) user input data indicative of a donation to the first qualifying charity. User input (e.g., received by I/O 320 of user device 102) may be a gesture or audible command detected by one or more sensors of user device 102. For example, a user may identify that he or she wishes to donate to the recommended first qualifying charity by e.g., selecting a button, blinking, winking, issuing a vocal command, or touching a touch display (e.g., display 370). In some embodiments, a selection input may include performing a detectable gesture associated with the first qualifying charity or the identified object. For example, in some embodiments, a user may select the first qualifying charity by visually focusing on the object and simultaneously making a gesture that may be detected by user device 102.

In block 660, mobile device (e.g., user device 102) may generate a donation request which may include a request to initiate a transfer of funds from a user account associated with a user (e.g., user device 102) to a charity financial account associated with the selected first qualifying charity.

In block 670, in response to generating the donation request, user device 102 may transmit to the server (e.g., third-party server 128 and/or third-party financial service provider server 126) the donation request for execution. In some embodiments, the system may (e.g., via transaction server 114) send a confirmation of the donation amount and the executed donation request to the user device 102.

Exemplary Use Cases

The following exemplary use case describes one example of a typical user flow pattern. It is intended solely for explanatory purposes and not in limitation. The user may see an object (e.g., statue, monument, mural, or recreational park) that inspires the user to make a donation to a charity that the user associates with that object. To indicate that he/she wants to donate to a charitable organization associated with the object, the user may select the object by, for example, taking a picture, scanning an RFID tag associated with the object, or gesturing at the object with a predetermined gesture (e.g., giving a thumbs up sign) such that the thumbs up motion may be detected by a camera of their mobile device (e.g. user device 102). The system (e.g., donation system 108 via donation facilitation system 120) may identify the object using the image, scanned RFID tag, and/or the gesture. The system (e.g., via donation facilitation system 120 of donation system 108) may use image recognition techniques to identify the object in the image by comparing images of the object obtained by the mobile device to a database of items associated with participating charities (e.g., using database 118 to store charity organization data). Once the system identifies the object, it (e.g., via donation facilitation system 120) may select one of a plurality of qualifying charities as the first qualifying charity and provide an augmented environment to the user (e.g., via user device 102) that may provide information (e.g., visual and/or audible information) about the identified object, such as the recommended charity and a donation amount recommendation. For example, if the user is in Philadelphia and points his/her camera at a mural depicting Wilt Chamberlain, the system may identify the mural as the object and recommend that the user give money towards, e.g., a Philly Mural Arts program to support more murals, or the system may recommend a charity supporting black history (such as a local African American History Museum) depending on the user's preferences among identified interests and the distance of the identified object from each respective charity. In some embodiments, the user device (e.g., user device 102) may display an augmented reality including, e.g., the top three (3) recommended charities, and a respective recommended donation amount. Once the user has decided to make a donation, he/she may click a button or perform a gesture in view of a camera of the mobile device (e.g., user device 102).

Optionally, in some embodiments, the system (e.g., via donation facilitation system 120) may facilitate another action in lieu of or in addition to making a donation to a charity. For example, the method may allow for donating towards homeless services. A user may point their camera at a homeless person that is at risk due to the weather (such as in a "Code Blue" weather event, in which it is dangerous to be outside for extended periods of time). The system may identify based on location data and the image that the homeless person needs help, which would be uploaded to a homeless outreach service (e.g., third-party server 128), so that they could get the person and ensure his/her safety. The system may then recommend charities around homeless services, along with a recommended dollar amount (e.g., using display 370 of user device 102).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving organizational data associated with a plurality of charities, the organizational data comprising, for each charity of the plurality of charities:
      a charity name;
      associated subject matter comprising data representing one or more items that are associated with the charity;
      a charity financial account; and
      a charity location representing a location of an office of the charity; receiving, from a mobile device associated with a user:

environmental data comprising an image of at least a portion of an object, the environmental data representing a physical environment of the mobile device; and location data indicative of an image location at which the environmental data was obtained;

identifying, using image recognition techniques, the object;

identifying, based on the identified object, from among the plurality of charities, one or more qualifying charities by prioritizing the plurality of charities based on a proximity of each of the plurality of charities to the image location and a degree of correspondence between the identified object and the associated subject matter of each of the plurality of charities;

arranging a predetermined number of the one or more qualifying charities in an order;

until receiving user input data from the mobile device indicating a selection of a presented charity, iteratively:

augmenting the environmental data by adding virtual environmental data comprising enhanced content associated with the identified object, wherein the enhanced content is unrepresented in the physical environment and the enhanced content is a donation recommendation amount to give to the presented charity of the one or more qualifying charities based on past donations made by the user, wherein the presented charity is one of the predetermined number of the one or more qualifying charities;

transmitting, to the mobile device, the virtual environmental data comprising the presented charity for display;

receiving, from the mobile device, the user input data indicating the selection of the presented charity or a denial of the presented charity; and responsive to receiving the denial of the presented charity, change the presented charity to a next charity according to the order;

responsive to receiving, from the mobile device, the user input data indicative of the selection of the presented charity from the predetermined number of the one or more qualifying charities, receiving, from the mobile device, a donation amount associated with the selected presented charity; and initiating, based on the received user input data, a transfer of funds of the donation amount from a financial account associated with the user to the charity financial account associated with the selected presented charity.

2. The method of claim 1, wherein the identifying the order of the predetermined number of the one or more qualifying charities further comprises determining which respective charity location of each of the selected predetermined number of the one or more qualifying charities has a closest proximity to the image location and wherein prioritizing the plurality of charities comprises:

receiving an indication of a preference as between the proximity and the degree of correspondence;

determining a priority score for each charity of the plurality of charities by:

assigning a first value to the proximity based on a distance between the image location and the charity location;

assigning a second value to the correspondence based on the degree of correspondence;

modifying the first and second values based on the indication of the preference; and summing the modified first and second values; and ordering the plurality of charities in the order of their respective priority scores.

3. The method of claim 2, wherein assigning the second value to the correspondence based on the degree of correspondence comprises:

comparing the identified object to the one or more items that are associated with the charity; and identifying one or more charities of the plurality of charities in which the identified object matches an item of the respective one or more items.

4. The method of claim 2, wherein assigning the second value to the correspondence based on the degree of correspondence comprises:

comparing the identified object to the one or more items that are associated with the charity; and determining, based on machine learning techniques, that the identified object corresponds to an item of the respective one or more items.

5. The method of claim 1, further comprising;

transmitting, to the mobile device, the virtual environmental data for display along with a portion of the physical environments;

receiving, from the mobile device, additional user input data corresponding to a grabbing gesture the user makes toward the object indicating an intent to view details regarding the object; and responsive to receiving a signal, from the mobile device, denying a last of the predetermined number of the one or more qualifying charities in the order, ending the method without making a donation.

6. The method of claim 1, wherein:

the charity location corresponds to global position system (GPS) coordinates, the object comprises one or more of a statue, a monument, a mural, a landmark, or combinations thereof, and the object is identified without using symbols.

7. The method of claim 1, wherein the past donations made by the user have been made to the one or more qualifying charities or similar charities, and wherein the past donations made by the user are identified by parsing through a transaction history of the user.

8. A method comprising:

receiving organizational data associated with a plurality of charities, the organizational data comprising, for each charity of the plurality of charities:

a charity name;

associated subject matter comprising data representing one or more items that are associated with the charity;

a charity financial account; and a charity location representing a location of an office of the charity; receiving, from a mobile device associated with a user:

an image including at least a portion of an object; and location data indicative of an image location at which the image was obtained;

identifying, using image recognition techniques, the object;

identifying, based on the identified object, from among the plurality of charities, one or more qualifying charities by prioritizing the plurality of charities based on a proximity of each of the plurality of charities to the image location and a degree of correspondence between the identified object and the associated subject matter of each of the plurality of charities;

arranging a predetermined number of the one or more qualifying charities in an order;

until receiving user input data from the mobile device indicating a selection of a presented charity, iteratively:
generating virtual environmental data comprising enhanced content associated with the identified object, wherein the enhanced content is unrepresented in the physical environment and the enhanced content is a donation recommendation amount to give to the presented charity of the one or more qualifying charities based on past donations made by the user to the one or more qualifying charities or similar charities, wherein the presented charity is one of the predetermined number of the one or more qualifying charities;
transmitting, to the mobile device, the virtual environmental data comprising the presented charity for display;
receiving, from the mobile device, the user input data indicating the selection of the presented charity or a denial of the presented charity,
responsive to receiving the denial of the presented charity, change the presented charity to a next charity according to the order;
responsive to receiving, from the mobile device, the user input data indicative of the selection of the presented charity from the predetermined number of the one or more qualifying charities, receiving, from the mobile device, a donation amount associated with the selected presented charity; and
initiating, based on the received user input data, a transfer of funds of the donation amount from a financial account associated with the user to the charity financial account associated with the selected presented charity.

9. The method of claim 8, wherein prioritizing the plurality of charities comprises:
determining a priority score for each charity of the plurality of charities by:
assigning a first value to the proximity based on a distance between the image location and the charity location;
assigning a second value to the correspondence based on the degree of correspondence;
summing the first and second values; and
ordering the plurality of charities in the order of their respective priority scores.

10. The method of claim 9, wherein assigning the second value to the correspondence based on the degree of correspondence comprises:
comparing the identified object to the one or more items that are associated with the charity; and
identifying one or more charities of the plurality of charities in which the identified object matches an item of the respective one or more items.

11. The method of claim 9, wherein assigning the second value to the correspondence based on the degree of correspondence comprises:
comparing the identified object to the one or more items that are associated with the charity; and
determining, based on machine learning techniques, that the identified object corresponds to an item of the respective one or more items.

12. The method of claim 8, further comprising:
receiving, from the mobile device, an indication of an electronic identifier associated with the object,
wherein identifying the object further comprises identifying the object based on the electronic identifier.

13. The method of claim 12, wherein the electronic identifier comprises one of an RFID tag or beacon that is detected by the mobile device.

14. The method of claim 8, further comprising:
storing, on a remotely viewable electronic map, a pin at the image location, wherein the pin represents one or more of the donation amount, the first qualifying charity, or an identification of a donor; and
transmitting, to a server associated with the selected presented charity, the image and the location data.

15. The method of claim 8, further comprising:
receiving user credentials associated with a social media account;
accessing the social media account with the user credentials; and
responsive to initiating the transfer of funds, posting content to the social media account, wherein the content comprises a representation of the donation amount to the first qualifying charity.

16. The method of claim 8, wherein the object is a three-dimensional, tangible object, and identifying the three-dimensional, tangible object uses three-dimensional models to aid the image recognition techniques.

17. A method comprising:
obtaining, by one or more sensors of a mobile device:
one or more images of an object, and
location data representative of a location of the mobile device;
transmitting, to a server, the one or more images of the object and the location data;
identifying, using image recognition techniques, the object from the one or more images;
until receiving user input by the mobile device indicating a selection of a presented charity, iteratively:
receiving, from the server, the presented charity, wherein the server is configured to identify and arrange one or more qualifying charities in an order based on the identified object, a proximity of each of a plurality of charities to an image location associated with the identified object, and a degree of correspondence between the identified object and associated subject matter of each of the plurality of charities, wherein the presented charity is one of the one or more qualifying charities;
displaying, on a display of the mobile device, the presented charity and a donation recommendation amount to give to the presented charity based on past donations made by a user of the mobile device;
receiving, by the mobile device, the user input indicating the selection of the presented charity or a denial of the presented charity; and
responsive to receiving the denial of the presented charity, transmitting, to the server, the denial of the presented charity, wherein the server changes the presented charity to a next charity according to the order;
responsive to receiving, by the mobile device, the user input indicative of a command to make a donation to the presented charity, receiving, by the mobile device, a donation amount associated with the selected presented charity;
generating, by the mobile device, a donation request, the donation request being representative of an instruction to transfer the donation amount from a financial account associated with the user of the mobile device to a financial account associated with the first qualifying charity; and transmitting, to the server, the donation request for execution.

18. The method of claim 17, wherein receiving the user input comprises:
    detecting a gesture performed by the user of the mobile device; and
    determining that the gesture indicates a selection of the first qualifying charity displayed by the mobile device.

19. The method of claim 17, further comprising display the predetermined number of the one or more qualifying charities in association with the object such that the predetermined number of the one or more qualifying charities are superimposed over a portion of the object.

20. The method of claim 17, further comprising:
    obtaining, by the one or more sensors of the mobile device, an indication of an electronic identifier associated with the object, and
    identifying the object based on the electronic identifier.

* * * * *